US011385060B2

(12) United States Patent
Yamazaki et al.

(10) Patent No.: US 11,385,060 B2
(45) Date of Patent: Jul. 12, 2022

(54) DOCKING CONTROL DEVICE, SHIP, DOCKING INFORMATION STORAGE DEVICE, DOCKING CONTROL METHOD, AND RECORDING MEDIUM

(71) Applicant: TOYOTA JIDOSHA KABUSHIKI KAISHA, Toyota (JP)

(72) Inventors: Takayoshi Yamazaki, Miyoshi (JP); Naoyuki Tsuzuki, Toyota (JP); Makoto Iwatsuki, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 16/548,330

(22) Filed: Aug. 22, 2019

(65) Prior Publication Data

US 2020/0080846 A1 Mar. 12, 2020

(30) Foreign Application Priority Data

Sep. 7, 2018 (JP) .............................. JP2018-168329

(51) Int. Cl.
   *G01C 21/20* (2006.01)
   *G05D 1/02* (2020.01)
   *G08G 3/00* (2006.01)
   *B63B 49/00* (2006.01)

(52) U.S. Cl.
   CPC ......... *G01C 21/203* (2013.01); *G05D 1/0206* (2013.01); *G08G 3/00* (2013.01)

(58) Field of Classification Search
   None
   See application file for complete search history.

(56) References Cited

U.S. PATENT DOCUMENTS

| 5,491,636 | A  | * | 2/1996  | Robertson  | ............... | B63H 25/42 |
|           |    |   |         |            |                 | 114/144 B  |
| 7,389,735 | B2 |   | 6/2008  | Kaji et al.|                 |            |
| 9,188,448 | B2 |   | 11/2015 | Fueller et al. |             |            |
| 9,581,695 | B2 | * | 2/2017  | Corbett    | .................| G01S 13/862|
| 9,952,595 | B2 |   | 4/2018  | Arbuckle et al. |            |            |
| 10,095,232 | B1 |   | 10/2018 | Arbuckle et al. |          |            |
| 10,126,748 | B2 |   | 11/2018 | Akuzawa   |                 |            |
| 10,198,005 | B2 |   | 2/2019  | Arbuckle et al. |          |            |
| 2007/0073454 | A1 | * | 3/2007 | Kaji     | .....................| G05D 1/0206|
|           |    |   |         |            |                 | 701/21     |
| 2015/0089427 | A1 |   | 3/2015 | Akuzawa  |                 |            |
| 2015/0330804 | A1 | * | 11/2015 | Okuda   | ...............| G01C 21/3664|
|           |    |   |         |            |                 | 701/487    |
| 2017/0314946 | A1 | * | 11/2017 | Tanabe  | ...............| G01C 21/3661|

(Continued)

FOREIGN PATENT DOCUMENTS

| JP | 2005-212693 A | 8/2005 |
| JP | 2006-137309 A | 6/2006 |

(Continued)

*Primary Examiner* — Aniss Chad
*Assistant Examiner* — Mahmoud M Kazimi
(74) *Attorney, Agent, or Firm* — Oliff PLC (57) ABSTRACT

A docking control device includes a memory storing docking information including information on a docking position of a ship and information on an azimuth in which the ship is anchored at the docking position; and a processor, including hardware, performing control related to a docking operation of the ship on a basis of the docking information stored in the memory.

10 Claims, 6 Drawing Sheets

(56) References Cited

U.S. PATENT DOCUMENTS

| | | | |
|---|---|---|---|
| 2018/0288572 A1* | 10/2018 | Imamura | G01C 21/3676 |
| 2019/0317504 A1 | 10/2019 | Akuzawa et al. | |
| 2021/0114698 A1* | 4/2021 | Moon | G08G 3/02 |

FOREIGN PATENT DOCUMENTS

| | | |
|---|---|---|
| JP | 2007-106397 A | 4/2007 |
| JP | 2015-066979 A | 4/2015 |
| JP | 2015-215278 A | 12/2015 |
| JP | 2017-154734 A | 9/2017 |
| WO | 2018/100749 A1 | 6/2018 |

* cited by examiner

| | POINT NAME | POSITION | AZIMUTH | AVAILA-BILITY |
|---|---|---|---|---|
| 1 | AAA | (○○○○, ○○○○) | N | ○ |
| 2 | BBB | (△△△△, △△△△) | W | × |
| ⋮ | ⋮ | ⋮ | ⋮ | ⋮ |

# DOCKING CONTROL DEVICE, SHIP, DOCKING INFORMATION STORAGE DEVICE, DOCKING CONTROL METHOD, AND RECORDING MEDIUM

CROSS-REFERENCE TO RELATED APPLICATION(S)

The present application claims priority to and incorporates by reference the entire contents of Japanese Patent Application No. 2018-168329 filed in Japan on Sep. 7, 2018.

BACKGROUND

The present disclosure relates to a docking control device, a ship, a docking information storage device, a docking control method, and a docking control program.

As a technology for supporting maneuvering of a movable body such as a ship, a technology has been known that displays information on the periphery of the movable body and information on a point registered in advance together with a map information (see, for example, Japanese Laid-open Patent Publication No. 2015-215278 A).

However, since the above-described technology does not assume that control is performed for docking a ship, it has not been possible to provide a support for a docking operation of the ship.

SUMMARY

There is a need for providing a docking control device, a ship, a docking information storage device, a docking control method, and a docking control program capable of supporting a docking operation of the ship.

According to an embodiment, a docking control device includes a memory storing docking information including information on a docking position of a ship and information on an azimuth in which the ship is anchored at the docking position; and a processor, including hardware, performing control related to a docking operation of the ship on a basis of the docking information stored in the memory.

According to an embodiment, a docking information storage device stores docking information including information on a docking position of a ship and information on an azimuth in which the ship is anchored at the docking position.

According to an embodiment, a docking control method is provided in which a docking control device performs control related to docking operation of a ship on a basis of docking information read from a memory that stores docking information including information on a docking position of the ship and information on an azimuth in which the ship is anchored at the docking position.

According to an embodiment, a non-transitory computer readable medium stores a docking control program causing a docking control device to perform control related to docking operation of a ship on a basis of docking information read from a memory that stores docking information including information on a docking position of the ship and information on an azimuth in which the ship is anchored at the docking position.

DETAILED DESCRIPTION

Hereinafter, with reference to the accompanying drawings, examples for carrying out the present disclosure (hereinafter referred to as "embodiments") will be described.

First Embodiment

Figure 1:
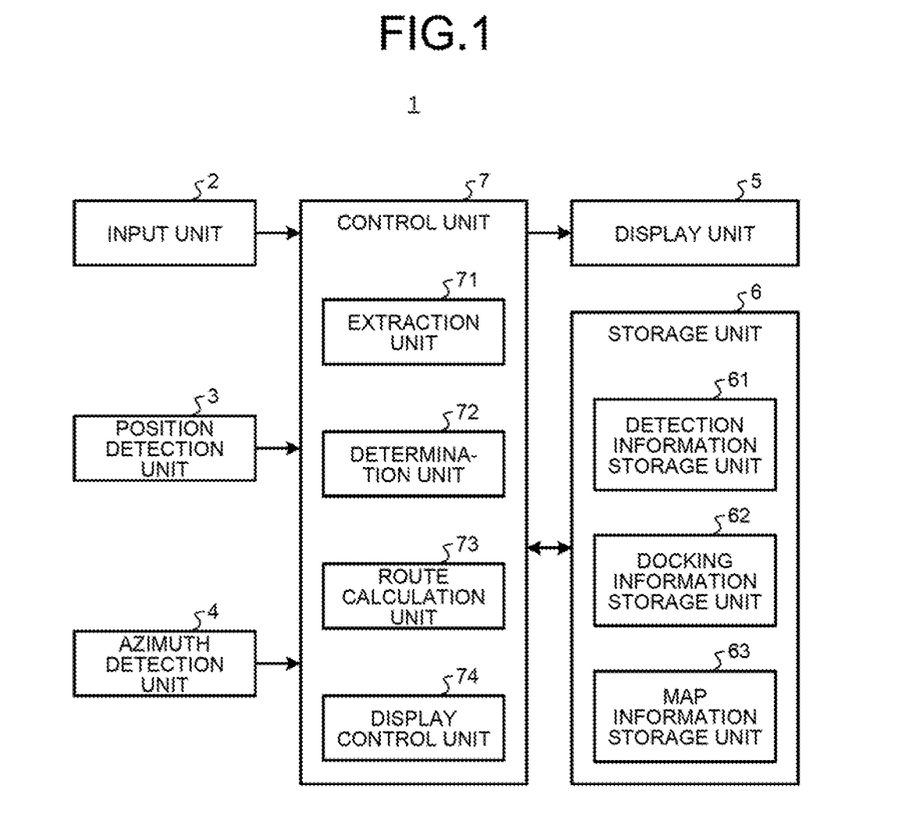
FIG. 1 is a block diagram illustrating an example configuration of a ship control device including a docking control device according to a first embodiment.

FIG. 1 is a block diagram illustrating an example configuration of a ship control device including a docking control device according to a first embodiment. A ship control device 1 illustrated in this figure is mounted on a ship, and includes an input unit 2, a position detection unit 3, an azimuth detection unit 4, a display unit 5, a storage unit (memory) 6, and a control unit (processor) 7.

The input unit 2 accepts an input of various types of information including instruction information regarding navigation of the ship. The input unit 2 includes a registration button for accepting an instruction input for registering, in the storage unit 6, information regarding a position and an azimuth of the ship in a docked state of the ship. Herein, the term "docked state" refers to, for example, a state in which the ship is moored with the length direction of the ship (the direction connecting the centers of the bow and the stern) substantially parallel along a pier of a port. In addition, the input unit 2 includes a determination button that accepts a determination input of a place at which the ship docks. The input unit 2 includes a user interface such as a keyboard, an input button, a lever, a touch panel provided by being layered on the display unit 5.

The position detection unit 3 detects a position of the ship. The position detection unit 3 uses, for example, a Global Positioning System (GPS) sensor that receives a GPS signal transmitted by a GPS satellite, and detects the position of the ship on the basis of a received signal. Position information in the case of using the GPS signal includes latitude and longitude information. The position detection unit 3 performs a position detection at a predetermined cycle, and outputs a detection result to the control unit 7. Note that, the position detection unit 3 may use two GPS sensors arranged at respective different positions on the ship. In this case, the position detection unit 3 acquires two sets of latitude and longitude information, and detects the center position thereof. In addition, the position detection unit 3 may use three or more GPS sensors arranged at different positions in the ship.

The azimuth detection unit 4 detects an azimuth toward which the bow of the ship faces. The azimuth detection unit 4 uses, for example, a GPS compass, and detects the azimuth toward which the bow of the ship faces on the basis of a received signal from a GPS satellite. The azimuth detection unit 4 performs the azimuth detection at a predetermined cycle, and outputs a detection result to the control unit 7. The azimuth detected by the azimuth detection unit 4 is not limited to the azimuth toward which the bow faces, and may be any direction of the ship (for example, a direction rotated by a predetermined angle around a vertical axis with respect to the stern direction or the bow direction). Note that, the azimuth detection unit 4 may use a magnetic compass. In addition, functions of the azimuth detection unit 4 and the position detection unit 3 may be collectively implemented by using the GPS compass.

The display unit 5 displays a map information indicating a current position of the ship and various types of information necessary for operating the ship. The display unit 5 is a display using, for example, a liquid crystal or organic Electro Luminescence (EL).

The input unit 2 and the display unit 5 do not necessarily mounted on the ship, and may be implemented using a portable terminal such as a smartphone. In this case, the input unit 2 and the display unit 5 only need to be communicably connected to the control unit 7 via a network. The network herein refers to a communication network formed by appropriately combining wired and wireless communications such as the Internet and a Local Area Network (LAN).

The storage unit 6 includes a detection information storage unit 61, a docking information storage unit 62, and a map information storage unit 63. The storage unit 6 is a docking information storage device according to the first embodiment.

The detection information storage unit 61 stores the position information and the azimuth information of the ship detected by the position detection unit 3 and the azimuth detection unit 4, respectively.

The docking information storage unit 62 stores one or a plurality of pieces of docking information including a position (docking position) at which the ship is docked and an azimuth (docking azimuth) of the bow of the ship at the time of docking, and identification information (point name, a label including a combination of a symbol and a letter linked to the point or the like) of the docking point. The docking position stored in the docking information storage unit 62 may be information of the region. For example, as the position information, a circular region may be used of a range including the ship with the position information at the time of docking detected by the position detection unit 3 as the center, and when the position detection unit 3 acquires a plurality of positions, a region may be used defined by connecting those positions to each other.

The docking information storage unit 62 may store, as the docking information, information on a docking side (port, starboard, bow, or stern) when the ship is docked, or information regarding a moving direction when the ship moves when the ship is docked. In this case, the ship may be provided with a sensor (for example, a camera) capable of determining the docking side, and when the control unit 7 acquires an instruction input signal by the registration button, information on the docking side as sensor information may be automatically registered as part of the docking information.

The map information storage unit 63 stores map information to be superimposed and displayed on a rout to the docking point of the ship when the route is displayed on the display unit 5.

The storage unit 6 uses a volatile memory such as a Random Access Memory (RAM) and a nonvolatile memory such as a Read Only Memory (ROM). Note that, the storage unit 6 may use a computer readable recording medium such as a memory card that can be externally mounted. The storage unit 6 stores various programs for executing the operation of the ship control device 1. The various programs include a docking control program according to the first embodiment. These various programs can also be distributed widely by being recorded in a computer readable recording medium such as a hard disk, flash memory, CD-ROM, DVD-ROM, or flexible disk.

The control unit 7 performs control related to a docking operation of the ship on the basis of the docking information stored in the storage unit 6. The control unit 7 includes an extraction unit 71, a determination unit 72, a route calculation unit 73, and a display control unit 74.

The extraction unit 71 extracts a docking point candidate on the basis of a condition set in advance from the plurality of pieces of docking information stored in the storage unit 6. The determination unit 72 determines availability of docking at the docking point candidate of the ship in accordance with a determination condition set in advance. The route calculation unit 73 reads the docking information of a determined docking point, sets target values of the docking position of the ship and the azimuth in which the ship is anchored, and calculates a route of the ship from a current point toward a target docking position. The display control unit 74 controls a display of the display unit 5 by performing, for example, an output of image data to the display unit 5.

The control unit 7 is a processor formed by single hardware device or combined hardware devices, for example, which is a dedicated integrated circuit that executes specific functions, such as a general-purpose processor such as a central processing unit (CPU), an Application Specific Integrated Circuit (ASIC) or a Field Programmable Gate Array (FPGA). The control unit 7 executes various types of arithmetic processing for operating the ship control device 1 by reading various programs stored in the storage unit 6.

In the ship control device 1 described above, the storage unit 6 and the control unit 7 constitute a docking control device according to the first embodiment.

Figure 2:
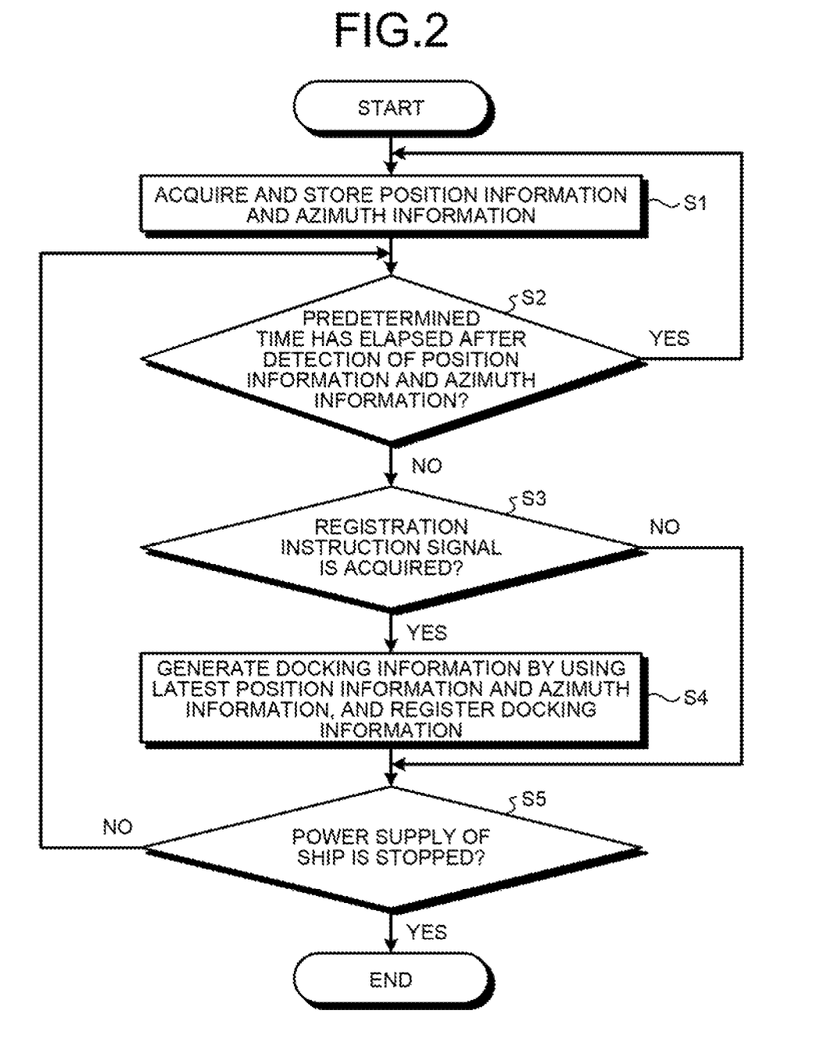
FIG. 2 is a flowchart illustrating an outline of a method for registering docking information that is performed by the ship control device when a ship is docked.

FIG. 2 is a flowchart illustrating an outline of a method for registering the docking information that is performed by the ship control device 1 when the ship is docked. The control unit 7 acquires position information and azimuth information of the ship detected by the position detection unit 3 and the azimuth detection unit 4, respectively, and writes and stores the information in the storage unit 6 (step S1).

Thereafter, when a predetermined time has elapsed after the detection by the position detection unit 3 and the azimuth detection unit 4 (step S2: Yes), the processing returns to step S2. On the other hand, when the predetermined time has not elapsed after the detection by the position detection unit 3 and the azimuth detection unit 4 (step S2: No), the ship control device 1 proceeds to step S3. Note that, although a case has been described where the detection processing is performed synchronously by the position detection unit 3 and the azimuth detection unit 4 for simplification purposes, the position detection unit 3 and the azimuth detection unit 4 may perform their detection processes at difference timing or at different cycles.

In step S3, when the registration button of the input unit 2 accepts the input of a registration instruction signal and the control unit 7 acquires the registration instruction signal (step S3: Yes), the control unit 7 reads the latest information on the position and azimuth of the ship from the storage unit 6, generates the docking information by using docking information of the read position information and the read azimuth information, and registers the docking information in the storage unit 6 (step S4). When the input of the registration instruction signal is not accepted in step S3 (step S3: No), the ship control device 1 proceeds to step S5.

In step S5, when a power supply of the ship is stopped (step S5: Yes), the ship control device 1 ends the series of processing steps. On the other hand, when the power supply of the ship is not stopped (step S5: No), the ship control device 1 returns to step S2.

Figure 3:
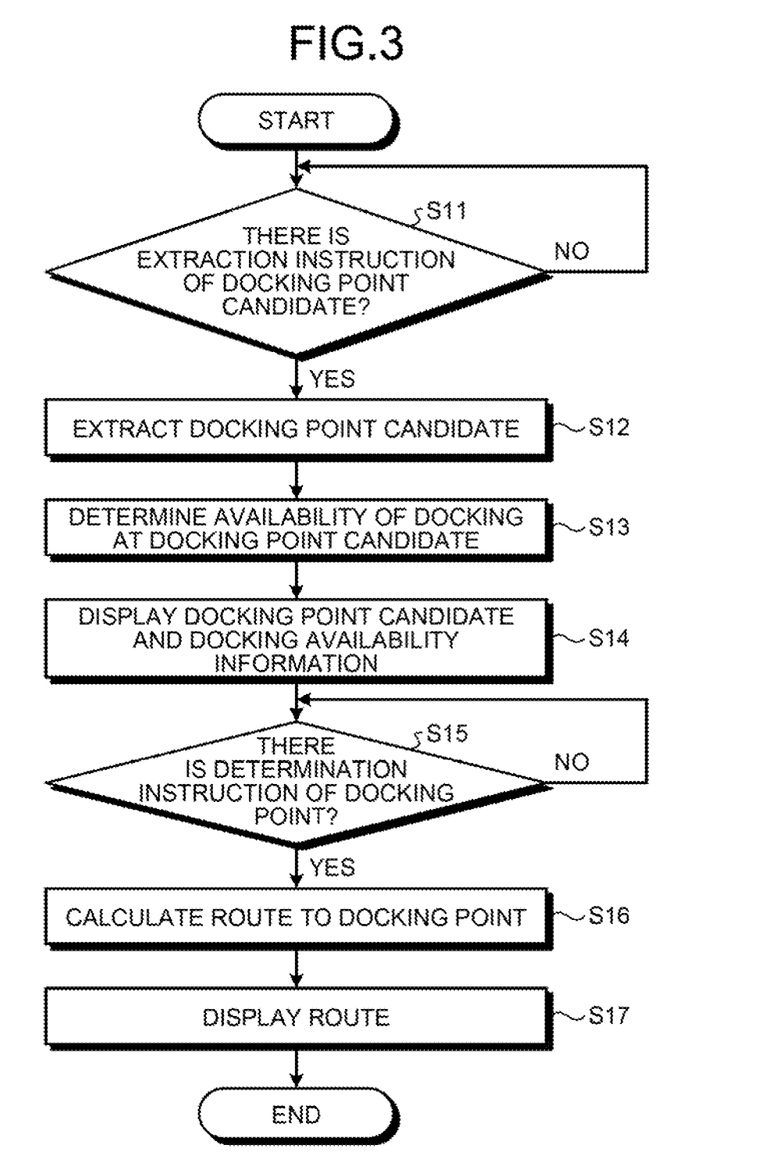
FIG. 3 is a flowchart illustrating an outline of processing in which the ship control device determines a docking point of the ship while the ship sails.

FIG. 3 is a flowchart illustrating an outline of processing in which the ship control device 1 determines the docking point of the ship while the ship sails. Note that, it is assumed that, during this processing, the position detection unit 3 and the azimuth detection unit 4 acquire position information and azimuth information, respectively, at a predetermined cycle, and the information is sequentially written and stored in the storage unit 6.

First, when the input unit 2 accepts the input of an extraction instruction signal of the docking point candidate, and the control unit 7 acquires the extraction instruction signal (step S11: Yes), the extraction unit 71 extracts the docking point candidate with reference to the latest position information and azimuth information of the ship, and the docking information stored in the storage unit 6 (step S12). The extraction unit 71 extracts one or a plurality of docking point candidates by, for example, retrieving a docking point within a predetermined range from the docking information storage unit 62 by using the latest position information of the ship. Note that, when the extraction unit 71 extracts the docking point, classification or narrowing-down of the docking point candidates may be performed. For example, the extraction unit 71 may classify the candidates based on the registration date or the area, or may narrow down the candidates based on conditions such as near the ship position, near the destination, the order of docking date and time and the like. The input unit 2 may accept the input of an extraction condition when accepting the input of the extraction instruction signal. In step S11, when the control unit 7 does not acquire the extraction instruction signal of the docking point candidate (step S11: No), the ship control device 1 returns to step S11.

Subsequently, in step S12, the determination unit 72 determines availability of docking of the ship with respect to the docking point candidates retrieved, by using, for example, the latest position information and azimuth information of the ship (step S13). The determination unit 72 determines whether the ship can be docked at the docking point candidate in a current navigation state, by using, for example, a current position information, the azimuth information, and a navigation information of the ship, and the docking information of the docking point candidate. Note that, the ship control device 1 may be provided with a communication function capable of externally acquiring the navigation information, anchorage information of other ships, weather information and the like in the periphery of the docking point candidate, for example, and the determination unit 72 may determine availability of docking by using such information as information regarding the docking point candidate.

After step S13, the display control unit 74 outputs, to the display unit 5, a control signal to cause the display unit 5 to display the extracted docking point candidate together with docking availability information (step S14).

Figure 4:
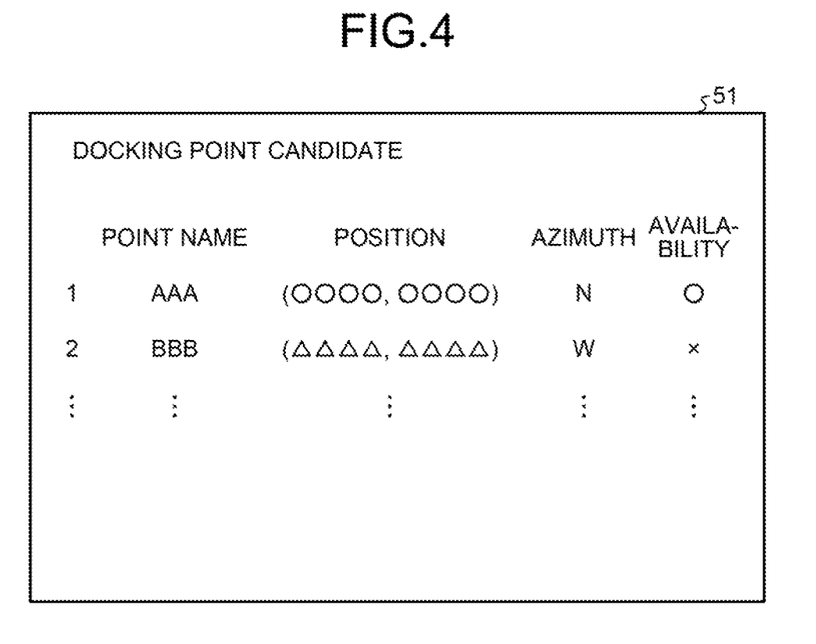
FIG. 4 is a diagram illustrating a screen display example of docking point candidates in a display unit.

FIG. 4 is a diagram illustrating a screen display example of the docking point candidates on the display unit 5. On a screen 51 illustrated in the figure, information on "point name", "position", "azimuth", and "availability" is displayed as the information on the docking point candidate. Note that, when the "docking side" or "docking direction" is included as the docking information, the information may be further displayed on the screen. In addition, when each docking point candidate is selected, the display unit 5 may transition to a screen displaying a map of the point and other detailed information. In addition, the display control unit 74 may cause the display unit 5 to display a message prompting an operation input for docking point determination.

Thereafter, when the input unit 2 accepts the input of a determination signal for determining the docking point and the control unit 7 acquires the determination signal (step S15: Yes), the route calculation unit 73 calculates a route from the current point of the ship to the docking point (step S16). In step S15, when the control unit 7 does not acquire the determination signal (step S15: No), the ship control device 1 returns to step S15.

Subsequently, the display control unit 74 generates data of an image to be displayed on the display unit 5 on the basis of a calculation result of the route calculation unit 73, and outputs the data to the display unit 5 to display the route on the display unit 5 (step S17). The display control unit 74 acquires map information of a corresponding area from the map information storage unit 63 on the basis of information regarding the current point and docking point of the ship, generates data of an image for performing superimposed display of the map information and information on the route calculated by the route calculation unit 73, and outputs the data to the display unit 5.

Figure 5:
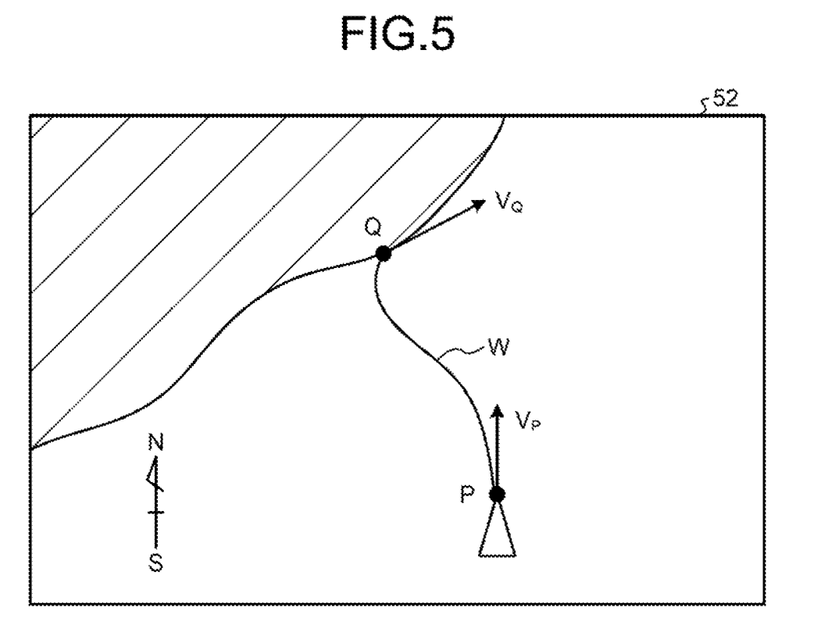
FIG. 5 is a diagram illustrating a screen display example of a route to the docking point in the display unit.

FIG. 5 is a diagram illustrating a screen display example of the route to the docking point in the display unit 5. On a screen 52 illustrated in the figure, a route W is displayed connecting a current position P of the ship to a position Q of the docking point. In addition, the screen 52 displays an azimuth $V_P$ of the ship at present and an azimuth $V_Q$ of the ship at the time of docking. Note that, for example, when the position Q in FIG. 5 is selected, a more detailed drawing (for example, a drawing including a pier and the like) near the docking point may be displayed.

After step S17, the ship control device 1 ends a series of the processing steps.

According to the first embodiment described above, the memory stores the docking information including the information on the docking position of the ship and the information on the azimuth in which the ship is anchored at the docking position, so that the docking operation of the ship can be supported using the information necessary at the time of anchoring.

In addition, according to the first embodiment, route calculation is performed by using at least the information on the docking position and the information on the azimuth in which the ship is anchored at the docking position, so that the docking operation can be properly supported even with a small number of detection units. In particular, only a small number of detection units need to be mounted on the ship, so that a docking control device can be provided that has a simple configuration and is easily mounted on the ship.

Note that, when registering the docking point of the ship, the control unit 7 may determine whether the ship is in the docked state on the basis of an operation state of the ship, and when it is determined that the ship is in the docked state, the control unit 7 may automatically register the position information and azimuth information in that state together with time information at the time of docking and the like. As a parameter that determines the operation state here, the engine rpm of the ship, the speed, acceleration and the like of the ship can be mentioned, for example. In this case, it may be sufficient that, at a point of time when information at the time of docking is automatically registered, the user is prompted to input information for identifying the information at the time of docking.

Second Embodiment

Figure 6:
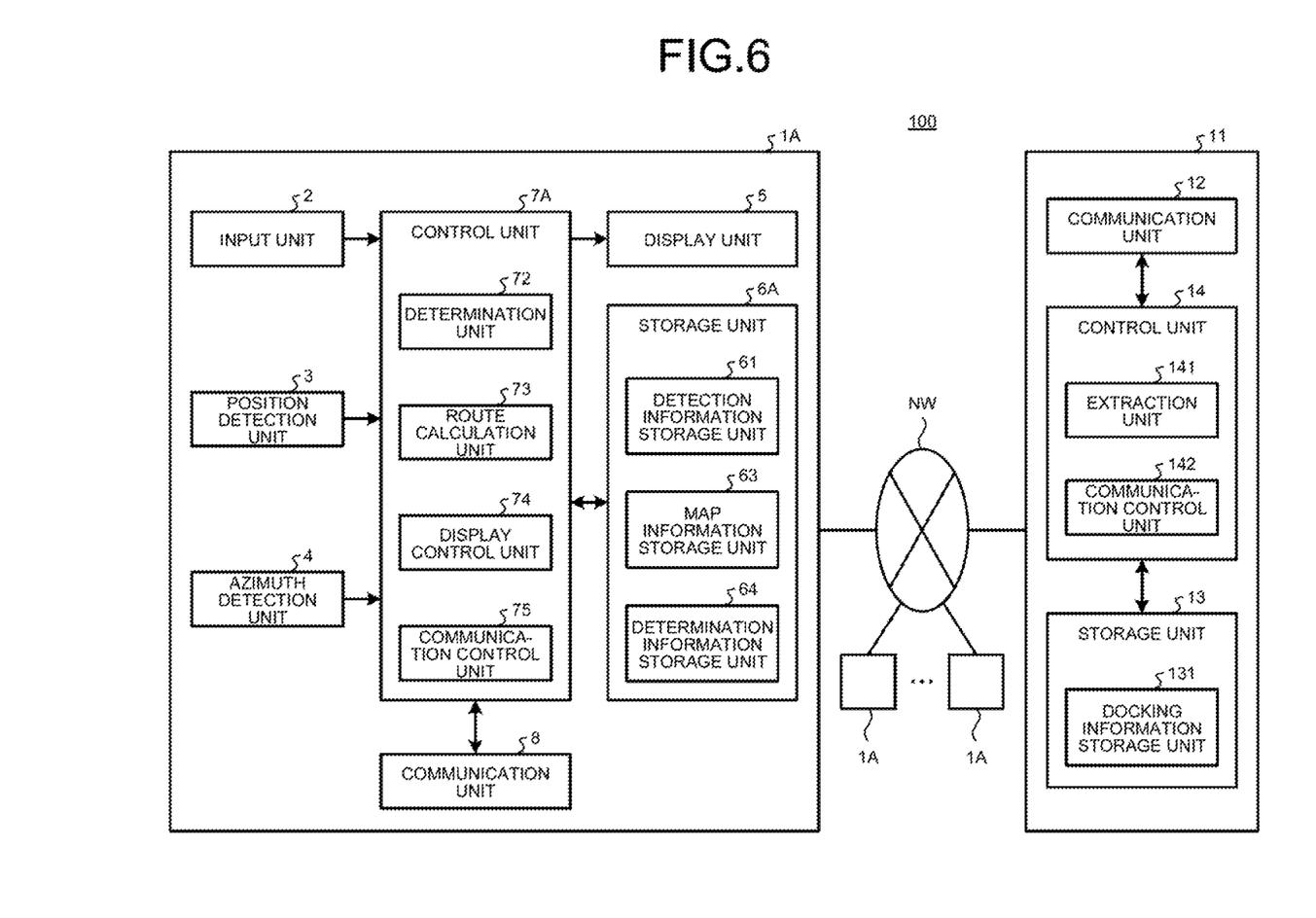
FIG. 6 is a block diagram illustrating an example configuration of a communication system including a docking control device according to a second embodiment.

FIG. 6 is a block diagram illustrating an example configuration of a communication system including a docking control device according to a second embodiment. A communication system 100 illustrated in the figure includes a plurality of ship control devices 1A and a docking information storage device 11 according to the second embodiment. The ship control devices 1A and the docking information storage device 11 are communicably connected to each other via a network NW.

The ship control devices 1A each include an input unit 2, a position detection unit 3, an azimuth detection unit 4, a display unit 5, a storage unit 6A, a control unit 7A, and a communication unit 8. Among these, constituents having the same configuration as those of the ship control device 1 described in the first embodiment are denoted by the same reference numerals as those of the ship control device 1.

The storage unit 6A includes a detection information storage unit 61, a map information storage unit 63, and a determination information storage unit 64. The determination information storage unit 64 stores docking information of a determined docking point. The storage unit 6A uses hardware such as a ROM or a RAM, and stores the information of various programs for controlling operation of a ship.

The control unit 7A includes a determination unit 72, a route calculation unit 73, a display control unit 74, and a communication control unit 75. The communication control unit 75 controls communications with an external device including the docking information storage device 11. The control unit 7A is a processor formed by a single or combined hardware devices such as a CPU, an ASIC or an FPGA.

The communication unit 8 communicates with an external device such as the docking information storage device 11 via the network NW under the control of the control unit 7A.

The docking information storage device 11 includes a communication unit 12, a storage unit 13, and a control unit 14. The docking information storage device 11 has a function as a database that stores detection information and docking information received from each of the plurality of ship control devices 1A mounted on the respective ships. The docking information storage device 11 is installed, for example, on land.

The communication unit 12 communicates with external devices such as the ship control devices 1A via the network NW under the control of the control unit 14.

The storage unit 13 includes a docking information storage unit 131 that stores docking information transmitted from the plurality of ship control devices 1A. The storage unit 13 is configured using hardware such as a ROM or a RAM, and stores information of various programs for controlling operation of the docking information storage device 11.

The control unit 14 includes an extraction unit 141 and a communication control unit 142. The extraction unit 141 extracts the docking information in response to an extraction request signal for the docking information received from each of the ship control devices 1A. Extraction processing of the extraction unit 141 is similar to the extraction processing of the extraction unit 71 described in the first embodiment. The communication control unit 142 controls communication with external devices including the ship control devices 1A. The control unit 14 is a processor formed by a single or combined hardware devices such as a CPU, an ASIC or an FPGA.

An outline will be described of registration processing of the docking point performed by the communication system 100 having the above configuration. In the ship control devices 1A, after the processing is performed of steps S1 to S4 described in the first embodiment, the communication control unit 75 controls the communication unit 8 to transmit the docking information to the docking information storage device 11. The docking information storage device 11 having received the docking information stores the received docking information in the docking information storage unit 131.

Next, an outline will be described of docking point determination processing performed by the communication system 100. When the control unit 7A acquires an extraction instruction signal, the communication control unit 75 controls the communication unit 8 to transmit the extraction request signal for a docking point candidate to the docking information storage device 11. In the docking information storage device 11 receiving the extraction request signal, the extraction unit 141 extracts the docking point candidate with reference to the docking information storage unit 131. Note that, as in the first embodiment, the input unit 2 of each of the ship control devices 1A may accept the input of the extraction condition when accepting the input of the extraction instruction signal. In this case, each of the ship control devices 1A adds the extraction condition to the extraction request signal and transmits the extraction request signal to the docking information storage device 11.

Processing after each of the ship control devices 1A receives the docking point candidate from the docking information storage device 11 is similar to that of the first embodiment (steps S13 to S17 in FIG. 3). The determination information storage unit 64 temporarily stores the docking information of the docking point candidate received from the docking information storage device 11, and deletes the docking information of the other docking point candidates at a point of time when the docking point is determined.

Note that, the function of the determination unit 72 may be provided in the docking information storage device 11. In this case, the docking information storage device 11 performs availability determination on the docking point candidate extracted by the extraction unit 141, and transmits the docking point candidate including a result of the availability determination to the ship control devices 1A.

According to the second embodiment described above, similar to the first embodiment, the docking operation of the ship using the information necessary at the time of anchoring can be supported.

In addition, according to the second embodiment, the docking information storage device is provided outside the ship, so that the storage unit of the ship does not have to store a large amount of data. For this reason, size and weight reduction can be achieved of the ship control device mounted on the ship.

Third Embodiment

Figure 7:
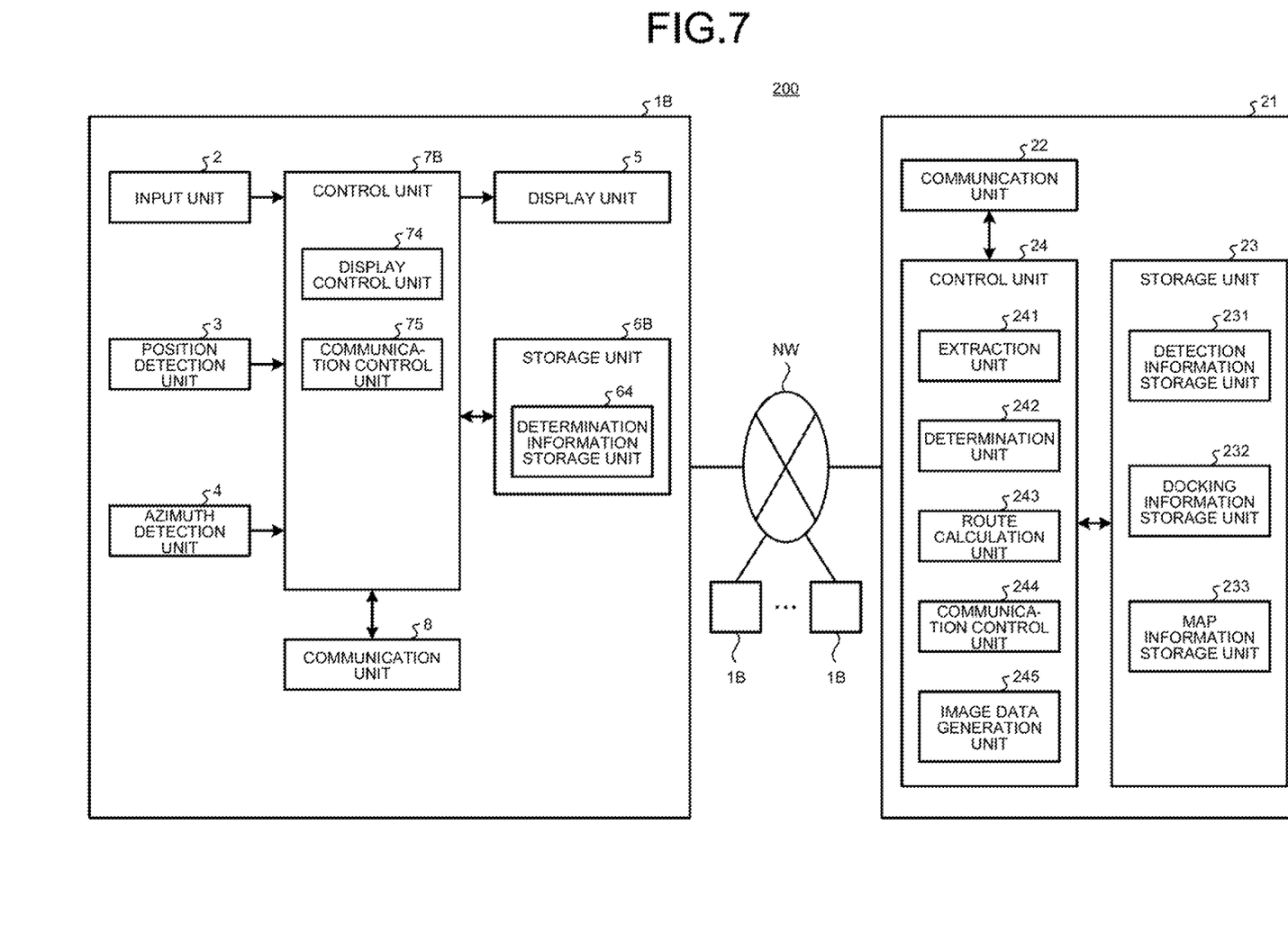
FIG. 7 is a block diagram illustrating an example configuration of a communication system including a docking control device according to a third embodiment.

FIG. 7 is a block diagram illustrating an example configuration of a communication system including a docking control device according to a third embodiment. A communication system 200 illustrated in the figure includes a plurality of ship control devices 1B and a management device 21. The ship control devices 1B and the management device 21 are communicably connected to each other via a network NW.

The ship control devices 1B each include an input unit 2, a position detection unit 3, an azimuth detection unit 4, a display unit 5, a storage unit 6B, a control unit 7B, and a communication unit 8. Among these, elements having the same configuration as those of the ship control devices 1 and 1A described in the first and second embodiments are denoted with the same reference numerals as those of the ship control devices 1 and 1A.

The storage unit 6B includes a determination information storage unit 64 that stores docking information of a determined docking point. The storage unit 6B uses hardware such as a ROM or a RAM, and stores information of various programs for controlling operation of a ship.

The control unit 7B includes a display control unit 74 and a communication control unit 75. The control unit 7B is a processor formed by a single or combined hardware devices such as a CPU, an ASIC or an FPGA.

The communication unit 8 communicates with an external device such as the management device 21 via the network NW under the control of the control unit 7B.

The management device 21 includes a communication unit 22, a storage unit 23, and a control unit 24. The management device 21 has a function as a docking control device that controls docking of the ship. The docking information storage device 11 is installed, for example, on land.

The communication unit 22 communicates with external devices such as the ship control devices 1B via the network NW under the control of the control unit 24.

The storage unit 23 includes a detection information storage unit 231, a docking information storage unit 232, and a map information storage unit 233. The detection information storage unit 231 stores various types of detection information (position information, azimuth information and the like) transmitted from the plurality of ship control devices 1B. The docking information storage unit 232 stores docking information of each of the ship control devices 1B. The map information storage unit 233 has a function similar to that of the map information storage unit 63 described in the first embodiment. The storage unit 23 uses hardware such as a ROM or a RAM, and stores information of various programs for controlling operation of the management device 21. The storage unit 23 is a docking information storage device according to the third embodiment.

The control unit 24 includes an extraction unit 241, a determination unit 242, a route calculation unit 243, a communication control unit 244, and an image data generation unit 245. The extraction unit 241 extracts the docking information in response to an extraction request signal for the docking information received from each of the ship control devices 1B. Extraction processing of the extraction unit 141 is similar to the extraction processing of the extraction unit 71 described in the first embodiment. The determination unit 242 and the route calculation unit 243 have the same functions as those of the determination unit 72 and the route calculation unit 73, respectively. The communication control unit 244 controls communication with external devices including the plurality of ship control devices 1B. The image data generation unit 245 acquires map information of a corresponding area from the map information storage unit 233 on the basis of information regarding the current point and docking point of the ship, and generates data of an image for performing superimposed display of the map information and information on the route calculated by the route calculation unit 243. The control unit 24 is a processor formed by a single or combined hardware devices such as a CPU, an ASIC or an FPGA.

In the communication system 200 according to the third embodiment, the management device 21 mainly performs processing related to docking control. Specifically, the management device 21 extracts a docking point candidate on the basis of detection information and an extraction instruction signal sent from each of the ship control devices 1B, and transmits the extraction result to each of the ship control devices 1B. In addition, the management device 21 calculates a route to a determined docking point on the basis of a determination signal of the docking point sent from each of the ship control devices 1B, generates image data in which the map information and the route information are superimposed on each other, and transmits the image data to each of the ship control devices 1B.

The ship control devices 1B each accepts acquisition of the position information and the azimuth information, inputs of a registration instruction signal of the docking point, the extraction instruction signal of the docking point candidate, and the determination signal of the docking point, and transmits those signals to the management device 21 via the network NW.

According to the third embodiment described above, similar to the first embodiment, the docking operation of the ship can be supported by using the information necessary at the time of anchoring.

In addition, according to the third embodiment, a load of the processing performed by the ship control device is reduced, so that simplification of the configuration of the ship control device and weight reduction can be achieved.

In addition, the dedicated management device performs calculation, whereby the calculation speed can be increased, and efficient docking control can be performed.

Note that, a configuration may be made in which, by separating the storage unit 23 from the management device 21, the docking control device and the docking information storage device are separated from each other, and the devices can be communicated via the network NW.

Although the first to third embodiments have been described above, the present disclosure should not be limited only by these embodiments. For example, the docking control device may be provided with an automatic operating function. In this case, the docking control device performs the automatic operation while referring to the docking information at the time of docking.

In addition, the docking control device may have a function of performing machine learning using a neural network, such as deep learning. In this case, the docking control device acquires docking information in ports around the world collected via a network as training data, and extracts docking point candidates using a learning model generated by learning docking histories.

As described above, the present disclosure may include various embodiments and the like not described herein.

According to the present disclosure, the memory stores the docking information including the information on the docking position of the ship and the information on the azimuth in which the ship is anchored at the docking position, so that the docking operation of the ship can be supported by using the information necessary at the time of anchoring.

According to an embodiment, control is performed in which the information is considered regarding the docking side of the ship or the moving direction of the ship at the time of docking, so that the docking operation can be properly supported.

According to an embodiment, it is possible to properly extract the docking point candidate at which the ship is enabled to dock, from the plurality of pieces of docking information, so that a user aboard the ship can efficiently grasp the docking point candidate.

According to an embodiment, it becomes possible for the user to select a docking point on the basis of the availability of docking at the docking point candidate.

According to an embodiment, the user can grasp the route of the ship calculated from the target value.

According to an embodiment, the memory stores the docking information including the information on the docking position of the ship and the information on the azimuth in which the ship is anchored at the docking position, so that the docking operation can be supported using information necessary when the ship itself anchors.

According to an embodiment, the position information and the azimuth information when the ship is docked are stored as the docking information, so that docking support can be performed based on a docking result of the ship.

According to an embodiment, the docking information is stored including the information on the docking position of the ship and the information on the azimuth in which the ship is anchored at the docking position, so that the docking operation of the ship can be supported using the information necessary at the time of anchoring.

According to an embodiment, control is performed in which the information is considered regarding the docking side of the ship or the moving direction of the ship at the time of docking, so that the docking operation can be properly supported.

According to an embodiment, the control related to the docking operation is caused to be performed by using the docking information including the information on the docking position of the ship and the information on the azimuth in which the ship is anchored at the docking position that are stored in the memory, so that the docking operation of the ship can be supported using the information necessary at the time of anchoring.

According to an embodiment, the control related to the docking operation is caused to be performed by using the docking information including the information on the docking position of the ship and the information on the azimuth in which the ship is anchored at the docking position that are stored in the memory, so that the docking operation of the ship can be supported using the information necessary at the time of anchoring.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A docking control device comprising:
    a memory configured to store first docking information including information regarding a docking position and an azimuth of a ship in a state in which the ship is anchored at the docking position; and
    a processor, including hardware, configured to:
        extract one or more docking point candidates at which the ship is able to dock based on a condition set in advance;
        determine availability of docking at the docking point candidates based on second docking information of the extracted one or more docking point candidates, position information and azimuth information of the ship, navigation information of the ship, anchorage information of other ships, and weather information in a periphery of the docking point candidates; and
        perform control related to a docking operation of the ship based on the first docking information including the information regarding the docking position and the azimuth stored in the memory.

2. The docking control device according to claim 1, wherein
    the memory is configured to further store information regarding a docking side at the docking position of the ship or a moving direction of the ship at time of docking.

3. The docking control device according to claim 1, wherein
    the memory is configured to store a plurality of pieces of the first docking information.

4. The docking control device according to claim 1, wherein
    the processor is configured to set target values of a docking position at a docking point selected from the docking point candidates and an azimuth at the time of docking, and calculates a route of the ship toward the docking point.

5. A ship comprising the docking control device according to claim 1.

6. The ship according to claim 5, wherein
    the processor is configured to acquire the information regarding the docking position of the ship and the azimuth of a predetermined direction, and
    the memory is configured to store the first docking information based on the information regarding the docking position and the azimuth at the time of docking.

7. The docking control device according to claim 1, wherein
    the condition is based on at least one of: (i) whether the one or more docking point candidates is near the ship position; (ii) whether the one or more docking point candidates is near a destination; (iii) a docking date; and a docking time.

8. The docking control device according to claim 1, further comprising:
    an input unit that accepts an input of various types of information including information regarding the navigation of the ship,
    the input unit comprising a registration button for accepting an instruction input for registering, in the memory, information regarding a position and an azimuth of the ship in a docketed state of the ship.

9. A docking control method comprising:
    storing, in a memory, first docking information including information regarding a docking position and an azimuth of a ship in a state in which the ship is anchored at the docking position;
    extracting one or more docking point candidates at which the ship is able to dock based on a condition set in advance;
    determining availability of docking at the docking point candidates based on second docking information of the extracted one or more docking point candidates, position information and azimuth information of the ship, navigation information of the ship, anchorage information of other ships, and weather information in a periphery of the docking point candidates; and performing control related to a docking operation of the ship based on the first docking information including the information regarding the docking position and the azimuth stored in the memory.

10. A non-transitory computer readable medium storing a docking control program causing a docking control device to perform a process, the process comprising:

storing, in a memory, first docking information including information on a docking position of a ship and information on an azimuth in which the ship is anchored at the docking position;

extracting one or more docking point candidates at which the ship is able to dock based on a condition set in advance; and determining availability of docking at the docking point candidates based on second docking information of the extracted one or more docking point candidates, position information and azimuth information of the ship, navigation information of the ship, anchorage information of other ships, and weather information in a periphery of the docking point candidates; and performing control related to a docking operation of the ship based on the first docking information including the information regarding the docking position and the azimuth stored in the memory.

* * * * *